(12) United States Patent
Nagakubo et al.

(10) Patent No.: US 7,031,621 B2
(45) Date of Patent: Apr. 18, 2006

(54) OPTICAL RECEIVING DEVICE

(75) Inventors: Yasunori Nagakubo, Kawasaki (JP); Tetsuya Kiyonaga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/998,032

(22) Filed: Nov. 29, 2004

(65) Prior Publication Data
US 2005/0100350 A1    May 12, 2005

Related U.S. Application Data

(63) Continuation of application No. PCT/JP02/07457, filed on Jul. 23, 2002.

(51) Int. Cl.
*H04B 10/06* (2006.01)
*H01J 40/14* (2006.01)

(52) U.S. Cl. .................. 398/208; 398/202; 250/214 C; 250/214 R

(58) Field of Classification Search ................ 398/202, 398/208; 250/214 A, 214 C, 238
See application file for complete search history.

(56) References Cited

U.S. PATENT DOCUMENTS

| 5,953,690 A * | 9/1999 | Lemon et al. ............... 702/191 |
| 6,643,472 B1 * | 11/2003 | Sakamoto et al. .......... 398/202 |
| 6,707,024 B1 | 3/2004 | Miyamoto et al. |
| 2002/0043614 A1 * | 4/2002 | Miyamoto et al. ...... 250/214 A |

OTHER PUBLICATIONS

International Search Report dated Aug. 27, 2002, corresponding to Japanese Published Application No. PCT/JP2002/07457.

Patent Abstracts of Japan, Publication No. 59-005756, dated Jan. 12, 1984.
Patent Abstracts of Japan, Publication No. 61-128637, dated Jun. 16, 1986.
Patent Abstracts of Japan, Publication No. 11-127122, dated May 11, 1999.
Patent Abstracts of Japan, Publication No. 04-283971, dated Oct. 8, 1992.
Patent Abstracts of Japan, Publication No. 06-151945, dated May 31, 1994.
Patent Abstracts of Japan, Publication No. 07-245540, dated Sep. 19, 1995.

* cited by examiner

*Primary Examiner*—M. R. Sedighian
*Assistant Examiner*—Nathan Curs
(74) *Attorney, Agent, or Firm*—Staas & Halsey LLP

(57) ABSTRACT

An optical receiving device which is improved in the accuracy of optical input interruption detection as well as in the alarm response and thus is capable of high-quality detection of interruption of the optical input. A light receiving element receives an optical signal and converts it into an electrical signal. A bias control section stabilizes a bias voltage applied to the light receiving element against variations in temperature and power supply. An optical input interruption protection section protects the light receiving element using a protective voltage so that the light receiving element may not be broken due to an excessive rise of the bias voltage when the optical input is interrupted. An alarm issuing section monitors the photocurrent of the light receiving element and issues an alarm on detecting an interruption of the optical input when the bias voltage and the protective voltage become equal to each other.

12 Claims, 15 Drawing Sheets

OPTICAL RECEIVING DEVICE

CROSS-REFERENCE TO RELATED APPLICATIONS

This application is a continuing application, filed under 35 U.S.C. § 111(a), of International Application PCT/JP2002/07457, filed on Jul. 23, 2002.

BACKGROUND OF THE INVENTION (1) Field of the Invention

The present invention relates to an optical receiving device, and more particularly, to an optical receiving device for receiving an optical signal and detecting an interruption of the optical input.

(2) Description of the Related Art

With the advent of a multimedia age involving the Internet, the optical network communication technologies for backbone communication systems are expected to meet demands for higher quality and wider coverage of services and are rapidly advancing to realize an information-oriented society. Also, in recent years, the capacity and transmission rate of optical communication lines are more and more increasing, and as a result, receiving sections of optical transmission systems are required to offer highly advanced functions. For example, the receiving sections are required to issue an alarm signal quickly in case the optical input is interrupted.

In optical receivers for optical fiber communications, APDs (Avalanche Photo-Diodes) having high light reception sensitivity are widely used as light receiving elements. An APD is an optical semiconductor device for converting light into an electrical signal and is used in a state (reverse-biased state) with voltage applied in a direction (cathode→anode) such that there is a higher resistance to the current flow through the diode.

While in this state, the APD is irradiated with light, whereupon the light is absorbed and electrons are excited inside the APD. When the excited electrons with high energy move, these electrons excite other electrons. This phenomenon repeats itself (the avalanche effect is caused), whereby an electrical signal is obtained.

Also, due to the avalanche effect, the APD produces a current multiplication action, which varies depending on the voltage applied to the APD (i.e., the signal amplification factor of the APD varies with change in the bias voltage applied to the APD). Further, the current multiplication action heavily depends on ambient temperature (the current multiplication action has a temperature characteristic).

Thus, to keep the multiplication factor of the APD constant irrespective of temperature variation, the bias voltage needs to be variably set in accordance with the ambient temperature. Also, in cases where the power supply undergoes variation, the bias voltage needs to be kept at a constant value irrespective of the power supply variation.

On the other hand, when the input of the optical signal is interrupted, the current (photocurrent) of the electrical signal converted by the APD approaches zero, with the result that the bias current of the APD also varies. Accordingly, in a conventional procedure for detecting an interruption of the optical input, the value of a control current, which is inversely proportional to the bias current of the APD, is compared with a threshold, and if it is judged as a result of the comparison that the optical input is interrupted, an alarm is issued. Thus, the control current inversely proportional to the bias current of the APD has conventionally been used as information based on which an interruption of the optical input is detected.

In the conventional optical input interruption detection, the control current is used to determine whether or not the optical input is interrupted, but since the bias voltage varies due to variations in temperature and power supply, as mentioned above, the value of the control current also varies. It is therefore necessary that the threshold level used for the detection should also be corrected in accordance with variations in temperature and power supply, and a correction circuit has hitherto been used for the purpose.

Such correction circuits are, however, constituted by analog devices and thus have errors differing from one circuit board to another. Also, in conventional optical receivers, since the correction is performed with respect to a weak control current, different circuit boards on which the respective optical receivers are mounted show different detection levels for detecting an interruption of the optical input, which leads to lowering of the quality and reliability of the optical receivers.

Meanwhile, in recent years, there has been a demand for a shorter response time required from an interruption of the optical input to the issue of an alarm (e.g., within 100 μs according to the Bellcore standard (currently, Telcordia standard)). However, according to the conventional optical input interruption detection, the time required until the issue of an alarm is long, and therefore, the alarm issue time is made to meet the standard by performing a logical operation using a fast alarm issued from a clock data recovery circuit, for example. This leads to an increase in the number of circuit elements and wiring patterns necessary for the logical operation, and thus the conventional optical receivers are not efficiently designed.

SUMMARY OF THE INVENTION

The present invention was created in view of the above circumstances, and an object thereof is to provide an optical receiving device which is improved in the accuracy of optical input interruption detection as well as in the alarm response and thus is capable of high-quality detection of interruption of the optical input.

To achieve the object, the present invention provides an optical receiving device for receiving an optical signal and detecting an interruption of the optical input. The optical receiving device comprises a light receiving element for receiving the optical signal and converting same into an electrical signal, a bias control section for stabilizing a bias voltage applied to the light receiving element against variations in temperature and power supply, an optical input interruption protection section for protecting the light receiving element by means of a protective voltage so that the light receiving element may not be broken due to an excessive rise of the bias voltage when the optical input is interrupted, and an alarm issuing section for monitoring a photocurrent of the light receiving element and issuing an alarm on detecting an interruption of the optical input when the bias voltage and the protective voltage become equal to each other.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
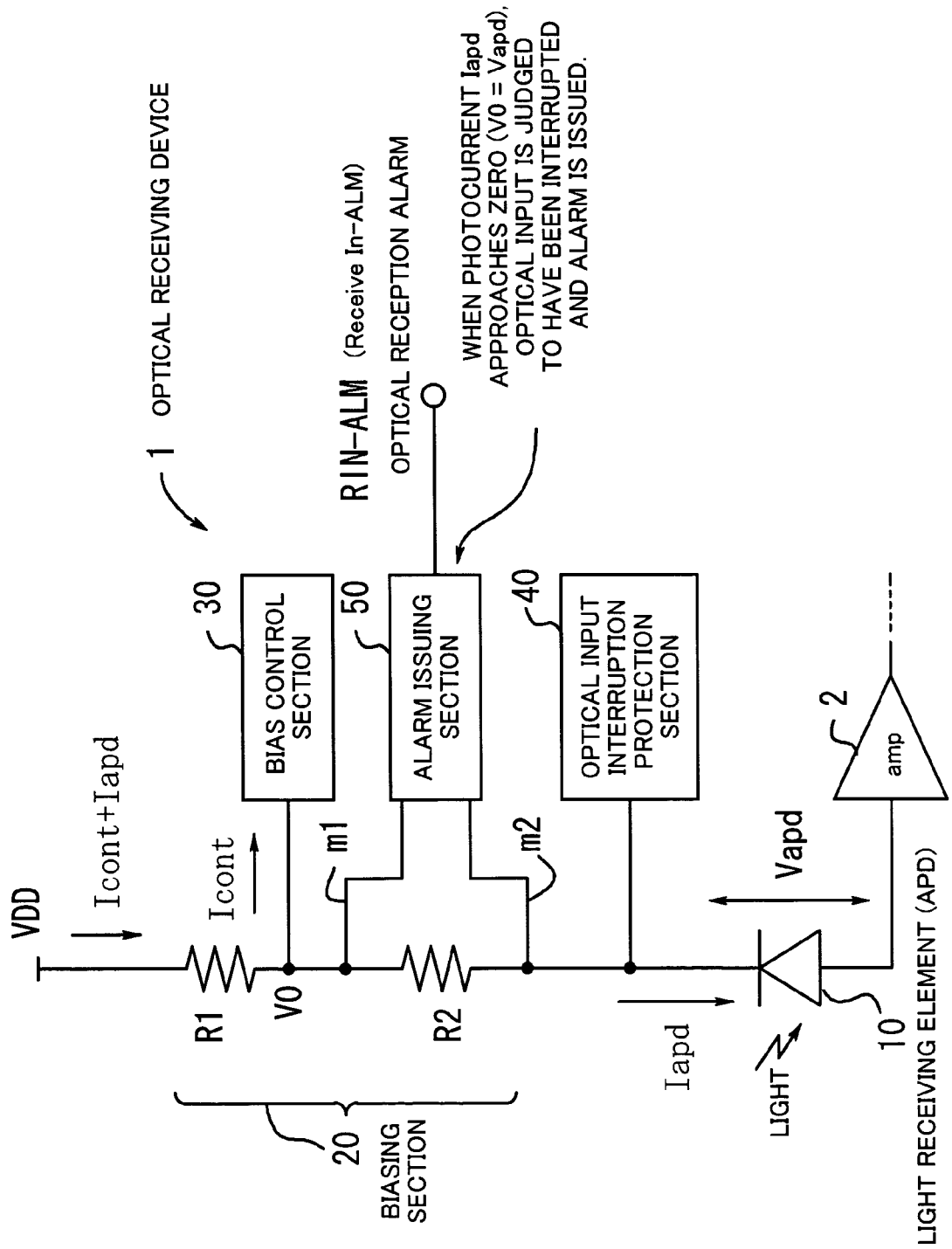
FIG. 1 is a diagram illustrating the principle of an optical receiving device according to the present invention.

Embodiments of the present invention will be hereinafter described with reference to the drawings. FIG. 1 illustrates the principle of an optical receiving device according to the present invention. The optical receiving device 1 of the present invention is constituted by circuits including a light receiving element (hereinafter APD) 10, a biasing section 20, a bias control section 30, an optical input interruption protection section 40, an alarm issuing section 50, an amplifier 2, etc. The optical receiving device receives an optical signal, and when the optical input is interrupted, the device detects the interruption and issues an alarm.

Elements constituting the device are connected as explained below. The biasing section 20 has resistors R1 and R2 connected in series. The resistor R1 has one end connected to a power supply voltage VDD, and the node between the resistors R1 and R2 is connected with the bias control section 30 and one monitoring terminal ml of the alarm issuing section 50.

The resistor R2 is connected at other end to the cathode of the APD 10, and the node between the resistor R2 and the APD 10 is connected with the other monitoring terminal m2 of the alarm issuing section 50 and the optical input interruption protection section 40. The anode of the APD 10 is connected to the amplifier 2, of which the output stage is connected to a CDR (Clock Data Recovery) circuit etc., not shown.

The APD 10 receives an optical signal and converts same into an electrical signal. The biasing section 20 generates a bias voltage V0 (reference potential=GND) applied to the APD 10. The bias control section 30 serves to stabilize the bias voltage V0 against variations in temperature and power supply. Specifically, for temperature variation, the bias voltage V0 is set so as to be variable in accordance with ambient temperature, and for power supply variation, the bias voltage V0 is controlled so as to be kept constant.

The optical input interruption protection section 40 protects the APD 10 by means of a protective voltage Vapd so that the APD 10 may not be broken due to an excessive rise of the bias voltage V0 (up to the breakdown voltage of the APD 10) when the optical input is interrupted (the protective voltage Vapd is a voltage falling within the range of the bias voltage V0 and appearing across the APD 10).

The alarm issuing section 50 monitors a photocurrent Iapd induced due to the optical-to-electrical conversion by the APD 10. On detecting an interruption of the optical input, the alarm issuing section issues an alarm (optical reception alarm RIN-ALM). Specifically, when the bias voltage V0 and the protective voltage Vapd become equal to each other (when the photocurrent Iapd approaches zero), it is judged that the optical input has been interrupted, and the optical reception alarm RIN-ALM is issued.

An alarm issue time from the interruption of the optical input to the issue of the optical reception alarm RIN-ALM by the alarm issuing section 50 is controlled based on the time constant of the bias control section 30 and the time constant of the optical input interruption protection section 40, as described in detail later with reference to FIG. 5.

Figure 2:
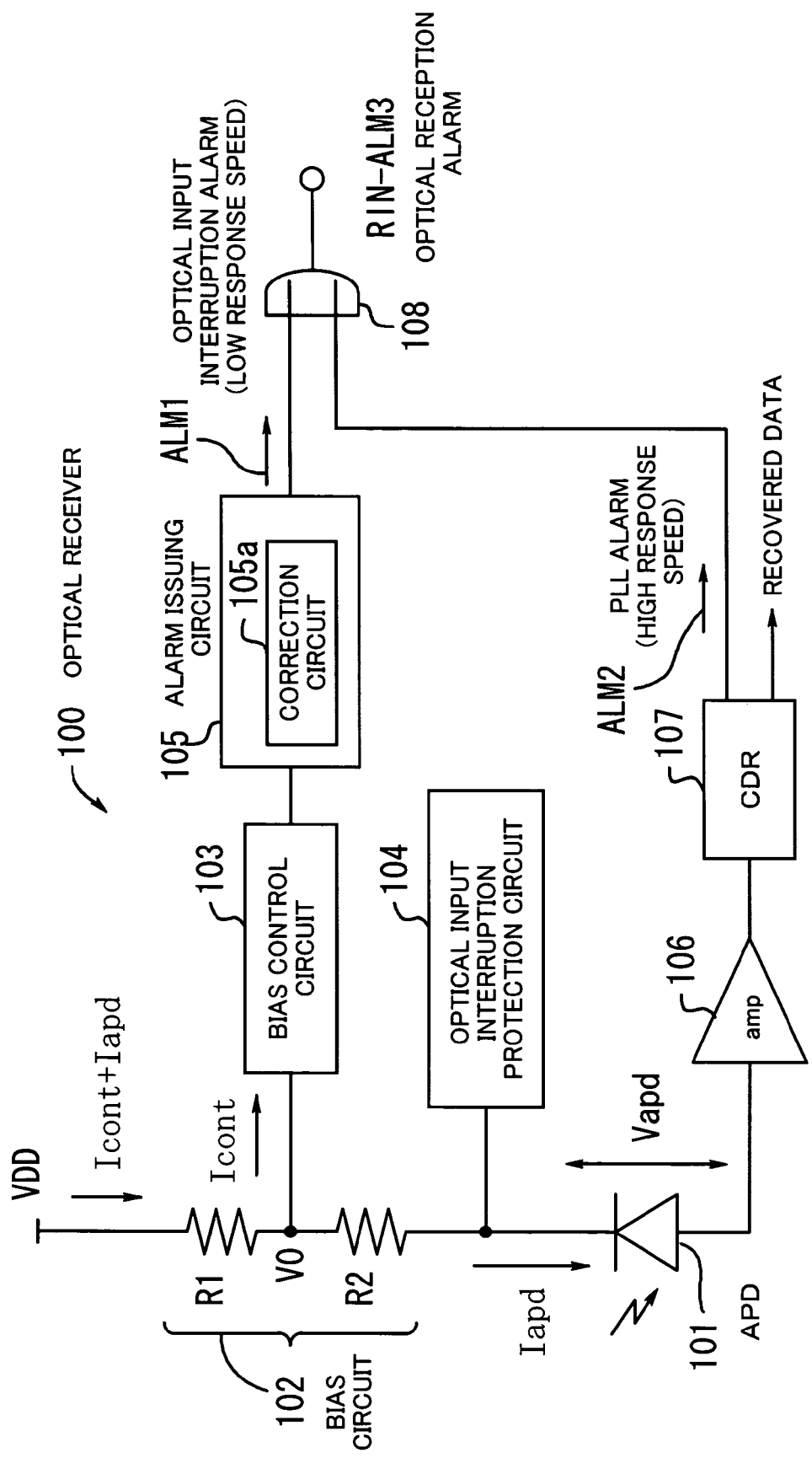
FIG. 2 is a diagram showing the arrangement of an optical receiver.

Problems that the present invention is to solve will be now explained in detail. FIG. 2 shows the arrangement of an optical receiver. The conventional optical receiver 100 comprises an APD 101, a bias circuit 102, a bias control circuit 103, an optical input interruption protection circuit 104, an alarm issuing circuit 105, an amplifier 106, a CDR circuit 107, and an OR gate 108.

Elements constituting the receiver are connected as explained below. The bias circuit 102 has resistors R1 and R2 connected in series. The resistor R1 has one end connected to a power supply voltage VDD, and the node between the resistors R1 and R2 is connected with the bias control circuit 103. The alarm issuing circuit 105 is connected at the succeeding stage of the bias control circuit 103. The resistor R2 is connected at other end to the cathode of the APD 101, and the node between the resistor R2 and the APD 101 is connected with the optical input interruption protection circuit 104. The anode of the APD 101 is connected to the amplifier 106, of which the output stage is connected to the CDR circuit 107.

The OR gate 108 obtains the OR of an optical input interruption alarm ALM1 output from the alarm issuing circuit 105 and a PLL alarm ALM2 output from the CDR circuit 107, to output an optical reception alarm RIN-ALM3. In this optical receiver 100, the optical reception alarm RIN-ALM3 is a final alarm signal indicating whether or not the optical signal is being normally received.

In this arrangement, the bias control circuit 103 changes the draw amount of a control current (Icont) so as to stabilize the bias voltage V0 against variations in temperature and power supply.

The alarm issuing circuit 105 detects an interruption of the optical input by using Icont, and issues the optical input interruption alarm ALM1 on detecting the interruption. Also, the alarm issuing circuit 105 has the aforementioned correction circuit 105a therein.

When the optical input is interrupted, the optical input interruption protection circuit 104 protects the APD 101 by means of a protective voltage Vapd so that the APD 101 may not be broken due to a rise of the bias voltage V0 up to the breakdown voltage. The APD 101 converts the received optical signal to an electrical signal, and the amplifier 106 amplifies the electrical signal.

The CDR circuit 107 includes a PLL circuit (not shown). The CDR circuit extracts, by means of the PLL circuit, a clock signal, or timing information, from the signal output from the amplifier 106 and recovers data by using the extracted clock signal.

The following describes the operation performed by the optical receiver 100 when the optical input has been interrupted. If the optical input is interrupted, the photocurrent Iapd approaches zero (because of the influence of noise etc., the photocurrent Iapd does not become exactly zero when the optical input is interrupted), with the result that the bias voltage V0 approaches the power supply voltage VDD. Consequently, the amount of the current Icont increases due to the interruption of the optical input, compared with the current Icont that was flowing during normal reception of the optical signal.

The alarm issuing circuit 105 monitors change in the amount of the current Icont with reference to a set threshold. If the set threshold is exceeded, the alarm issuing circuit judges that the optical input has been interrupted and generates the optical input interruption alarm ALM1.

However, since Icont changes also with variations in temperature and power supply, the correction circuit 105a included in the alarm issuing circuit 105 corrects the threshold level in accordance with such variations in temperature and power supply. Specifically, the correction circuit 105a operates in the manner described below. Let it be assumed, for example, that at a certain level of the power supply voltage VDD, the draw amount of Icont is 1 µA and that the threshold level for this draw amount is 1.5 µA (accordingly, the optical input is judged to have been interrupted if Icont exceeds 1.5 µA).

If the power supply voltage VDD rises thereafter and the draw amount of Icont increases to 2 µA (the draw amount of Icont increases in order to keep the bias voltage V0 constant), the threshold needs to be corrected to 2.5 µA (=2.0+ 0.5). Such correction is carried out by the correction circuit 105a.

However, the correction circuit 105a is constituted by analog devices and thus is subject to error that varies from one circuit board to another. Namely, the threshold level slightly differs from one circuit board to another. Since the correction circuit 105a corrects the threshold for the weak current Icont, even a slight difference of the threshold level causes the disadvantage that different circuit boards on which the respective optical receivers 100 are mounted show different levels for the detection of interruption of the optical input.

Figure 3:
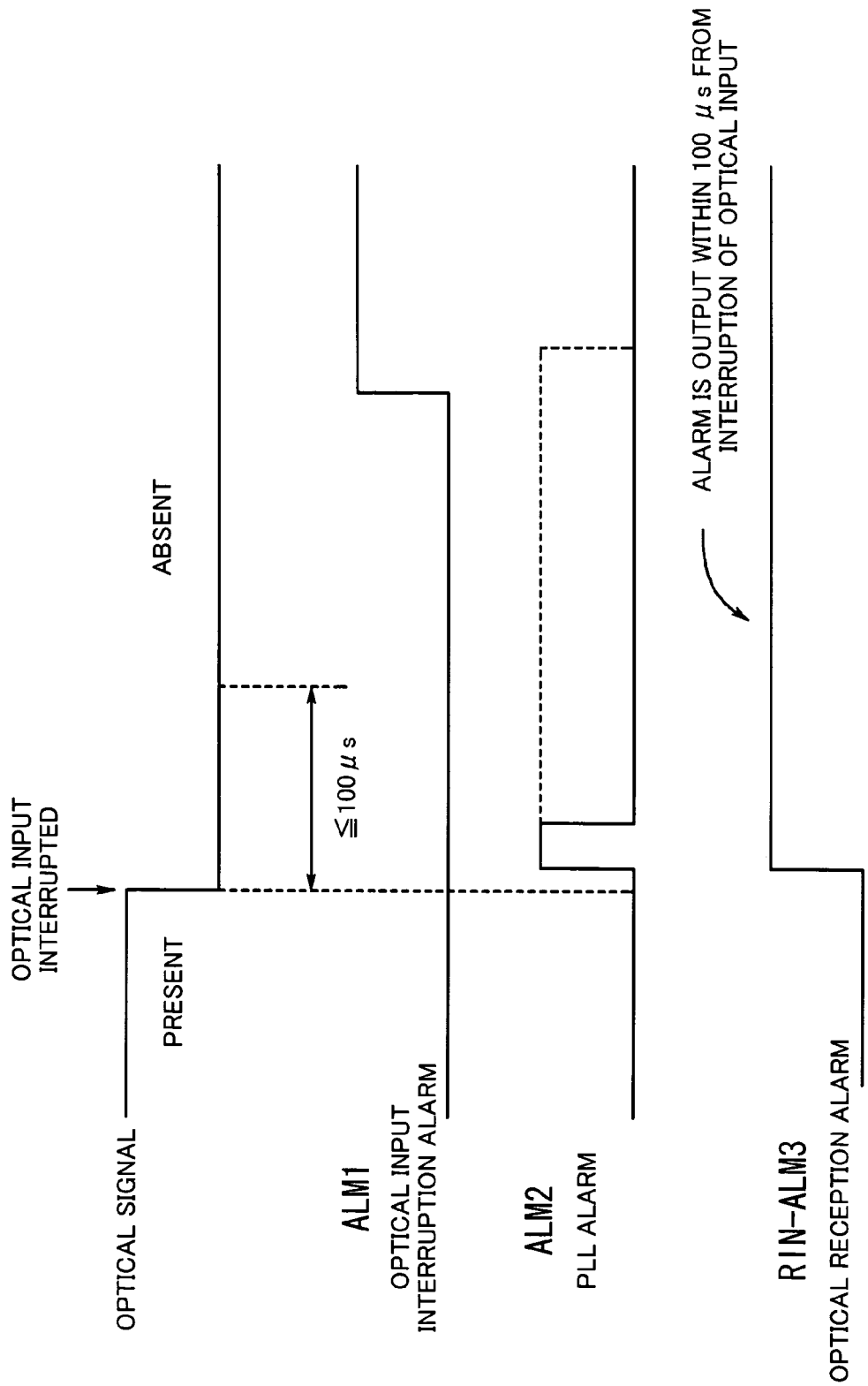
FIG. 3 is a timing chart showing alarms.

The following explains the reason why the OR gate 108 is used in the optical receiver 100 to perform a logical operation on the alarms. FIG. 3 is a timing chart showing the alarms. According to the standard, it is necessary that when the optical input is interrupted, an alarm should be output within 100 µs from the occurrence of the interruption. In FIG. 3, the optical signal levels "H" and "L" indicate the presence and absence, respectively, of the optical signal, and the alarms are enabled when the respective alarm signals are at the level "H".

In the alarm issuing circuit 105 shown in FIG. 2 which is constituted by analog passive elements, however, the response speed of the optical input interruption alarm ALIM is as slow as several milliseconds (ms). Thus, it is not practical to use the optical input interruption alarm ALMI alone as the final optical reception alarm. Conventionally, therefore, the optical reception alarm RIN-ALM3 is generated by deriving the OR of the slow optical input interruption alarm AIM1 and the fast PLL alarm ALM2 from the CDR circuit 107.

The CDR circuit 107 operates at the same rate as the transmission rate of the optical signal (e.g., in the case of optical communication at 2.4 Gb/s, the CDR circuit 107 also operates at 2.4 Gb/s), and accordingly, the response speed of the PLL alarm ALM2, which is indicative of PLL loss-of-lock within the CDR circuit 107, is as fast as several nanoseconds (ns).

Thus, by obtaining the OR of the PLL alarm ALM2 and the optical input interruption alarm ALM1, it is possible to generate an alarm signal, or the conventional optical reception alarm RIN-ALM3, within 100 µs as shown in FIG. 3. The PLL alarm ALM2 is a pulse signal, and therefore, in practice, the waveform thereof is extended by using a one-shot circuit etc. (in the figure, indicated by the dotted line) until the logical operation using the optical input interruption alarm ALM1 is completed.

The optical reception alarm RIN-ALM3 generated in this manner is, however, not an alarm based solely on interruption of the optical input (PLL loss-of-lock can be caused not only by an interruption of the optical input but also by a change in the transition rate of input data even while the optical signal is being received, depending on the performance of the PLL), and thus the optical input interruption detection using such an alarm cannot be said an optimum detection method. Also, since the number of circuit elements and wiring patterns increases because of the need for the logical operation, it cannot be said that the device using this detection method is optimally designed.

Thus, the conventional optical receiver 100 is associated with the aforementioned problems arising from the arrangement in which interruption of the optical input is detected using the control current Icont. The present invention provides an optical receiving device which is adapted to detect an interruption of the optical input by directly monitoring the photocurrent flowing through the APD, thereby solving the above problems, which is improved in the accuracy of the optical input interruption detection as well as in the alarm response speed, and which is thus high in quality and reliability.

Figure 4:
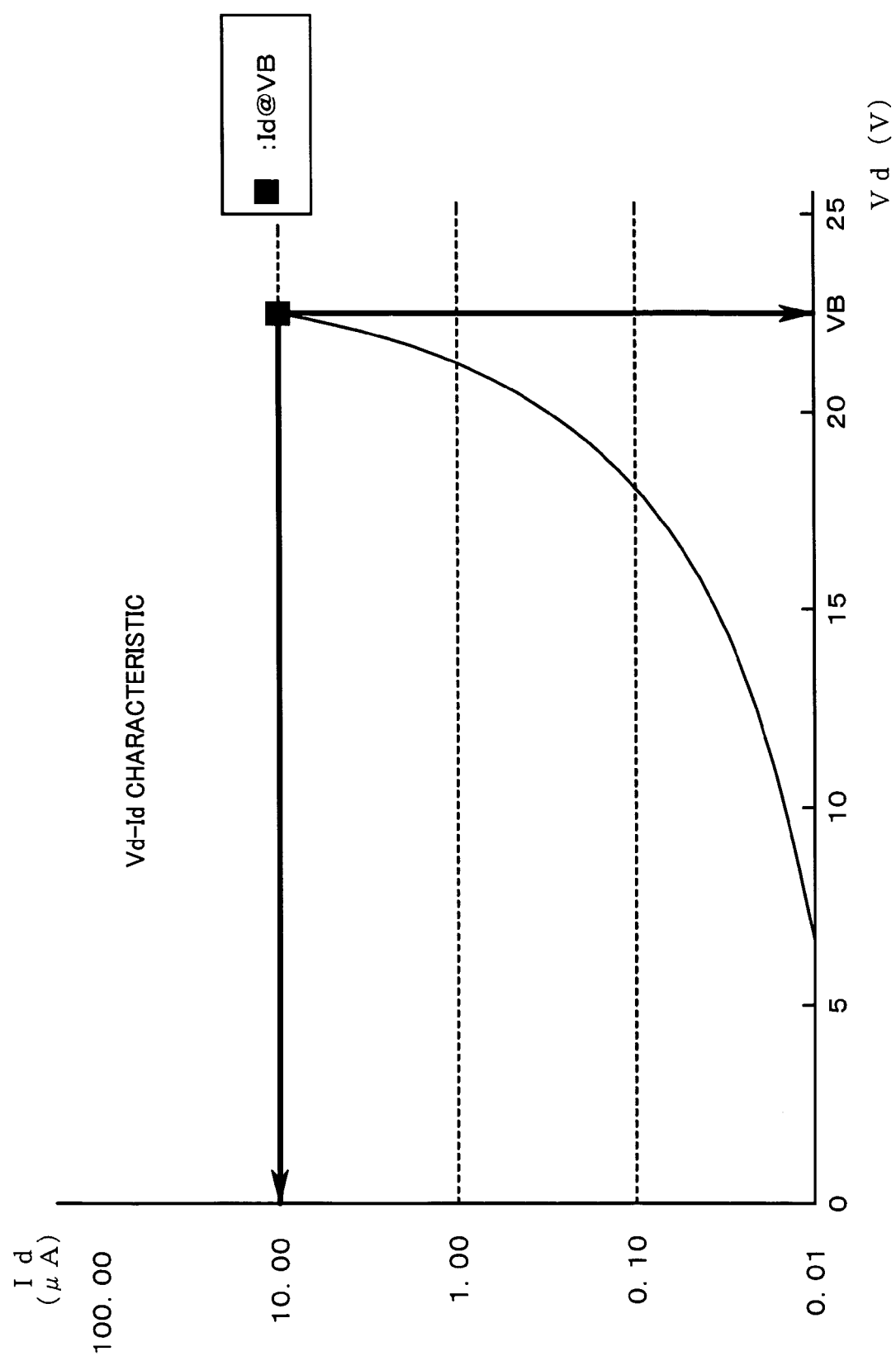
FIG. 4 is a graph showing the breakdown voltage of an APD.

The breakdown voltage of the APD 10 will be now explained. FIG. 4 is a graph showing the breakdown voltage of an APD, or more specifically, a static characteristic of an APD showing the relation between applied voltage and photocurrent, wherein the horizontal axis indicates applied voltage Vd and the vertical axis indicates photocurrent Id.

When applied with a certain voltage Vd, the APD allows a current proportional to the amount of incident light to flow therethrough. As the applied voltage Vd is increased, however, the APD gets out of the region in which the output thereof is proportional to the incident light amount, and a large current flows, which phenomenon is called breakdown. The applied voltage inducing the phenomenon is called breakdown voltage.

In the present invention, an applied voltage at which the photocurrent Id becomes equal to 10 µA is defined as the breakdown voltage VB and the optical input interruption protection section 40 protects the APD 10 so that the APD may not be applied with the breakdown voltage VB.

The following describes how voltage waveforms change due to time constants. FIG. 5 shows changes of the voltage waveforms due to time constants, and waveforms H1 to H3 are illustrated in the figure. The waveform H1 indicates the optical reception level, where the vertical axis indicates the optical reception level and the horizontal axis indicates time.

The waveform H2 indicates voltage changes determined by the time constants of the bias control section 30 and optical input interruption protection section 40, where the vertical axis indicates voltage and the horizontal axis indicates time. The optical input interruption protection section 40 has a time constant τ1 and the bias control section 30 has a time constant τ2.

The dotted line Va indicates the waveform of a bias voltage observed in the case where the optical input interruption protection section 40 is not provided in the optical receiving device. The solid line Vb indicates the waveform of the bias voltage observed in the case where the optical input interruption protection section 40 is provided in the optical receiving device, and the thick solid line Vc indicates the waveform of the protective voltage of the optical input interruption protection section 40 (the overlapping part of the waveforms is indicated by the solid line).

The waveform H3 indicates the waveform of the optical reception alarm RIN-ALM issued according to the present invention, where the vertical axis indicates signal level and the horizontal axis indicates time (the alarm is enabled when the signal level is "L").

First, explanation will be made of how the bias voltage Va changes in the absence of the optical input interruption protection section 40. In a time interval T0 during which the optical receiving device 1 is normally receiving the optical signal, the bias voltage Va which is controlled by the bias control section 30 remains constant at V0. Also, no optical reception alarm RIN-ALM is issued.

Let it be assumed that the optical input is interrupted at time T1. Consequently, no optical signal is input and thus the photocurrent Iapd of the APD 10 approaches zero. In this instance, since no protection is provided against the interruption of the optical input, the bias voltage Va sharply rises toward the power supply voltage VDD. At this time, the bias voltage Va exceeds the breakdown voltage VB, as seen from FIG. 5.

During intervals T2 and T4, the bias control section 30 tries to return the bias voltage Va to the constant value V0. In this case, the bias voltage Va gradually approaches V0 in a time determined by the time constant τ2 of the bias control section 30.

Thus, in the case where the optical input interruption protection section 40 is not provided, the bias voltage Va exceeds the breakdown voltage VB of the APD 10 when the optical input is interrupted, possibly causing a breakdown of the APD 10.

Waveform changes observed in the case of the present invention will be now described. In the interval T0 during which the optical receiving device 1 is normally receiving the optical signal, the bias voltage Vb controlled by the bias control section 30 remains constant at V0, and the protective voltage Vc controlled by the optical input interruption protection section 40 also remains constant at Vapd. In this case, no optical reception alarm RIN-ALM is issued.

At the time T1, the optical input is interrupted, and since no optical signal is input, the photocurrent Iapd of the APD 10 approaches zero. The time constant τ1 is set for the protective voltage Vc of the optical input interruption protection section 40 so that the protective voltage may not exceed the breakdown voltage VB during the interval T2, and accordingly, the protective voltage Vc rises and falls, following the curve shown in FIG. 5. At this time, the bias voltage Vb also rises and falls along the curve shown in FIG. 5, in response to the change of the protective voltage Vc.

As will be understood from the circuit diagrams (FIGS. 6 and 7) described later, the time constant τ2 of the bias control section 30 and the time constant τ1 of the optical input interruption protection section 40 are not in an independent relationship but influence by each other. Specifically, as the time constant τ1 is increased by increasing the resistance of the resistor or the capacitance of the capacitor in a time constant circuit of the optical input interruption protection section 40, the time constant τ2 of the bias control section 30 also increases. Accordingly, in the interval T2, the bias voltage Vb shows a waveform corresponding to the change of the protective voltage Vc.

At time T3, the bias voltage Vb coincides with the protective voltage Vc, and at this point of time, the optical reception alarm RIN-AIM is issued. In the subsequent interval T4, the bias voltage Vb and the protective voltage Vc gradually approach V0.

The relationship between the alarm issue time and the time constants will be now described. Provided the time constant of the bias control section 30 is τ2, the time constant of the optical input interruption protection section 40 is τ1, and the time at which the optical reception alarm RIN-ALM is issued is t, the bias voltage V0 and the protective voltage Vapd can be expressed by the following functional equations:

$$V0 = f1(\tau 2, t) \tag{1}$$

$$Vapd = f2(\tau 1, t) \tag{2}$$

From V0=Vapd, $$f1(\tau 2, t) = f2(\tau 1, t) \tag{3}$$

and therefore, the issue time t for the optical reception alarm RIN-ALM is given by $$t = f3(\tau 1, \tau 2) \tag{4}$$

Thus, it will be understood that the issue time for the optical reception alarm RIN-ALM can be controlled by the two time constants, namely, the time constant τ1 of the optical input interruption protection section 40 and the time constant τ2 of the bias control section 30.

As stated above, according to the present invention, the alarm issue time is controlled based on the time constant τ1 of the optical input interruption protection section 40 and the time constant τ2 of the bias control section 30. Further, the time constants τ1 and τ2 are determined so that the bias voltage Vb and the protective voltage Vc may not exceed the breakdown voltage VB of the APD 10 when the optical input is interrupted and also that the time required from the interruption of the optical input until the bias voltage Vb and the protective voltage Vc coincide with each other meets the standard (e.g., within 100 μs) defining the alarm issue time.

The alarm issue time was actually measured. When the optical signal was interrupted at −7 dBm, the optical reception alarm RIN-ALM was issued in 84 μs, and when the optical signal was interrupted at −22 dBm, the optical reception alarm RIN-ALM was issued in 41 μs.

A specific circuit arrangement of the optical receiving device 1 of the present invention will be now described. FIGS. 6 to 9 show the circuit arrangement of the optical receiving device. As illustrated, the optical receiving device 1-1 is constituted by the APD 10, the biasing section 20, a bias setting control section 30a, a temperature compensation section 30b, the optical input interruption protection section 40, a photocurrent monitoring section 50a, an alarm amplification section 50b, an alarm discrimination section 50c, an optical power monitor amplification section 60a, and an optical power monitor level shifting section 60b.

Figure 6:
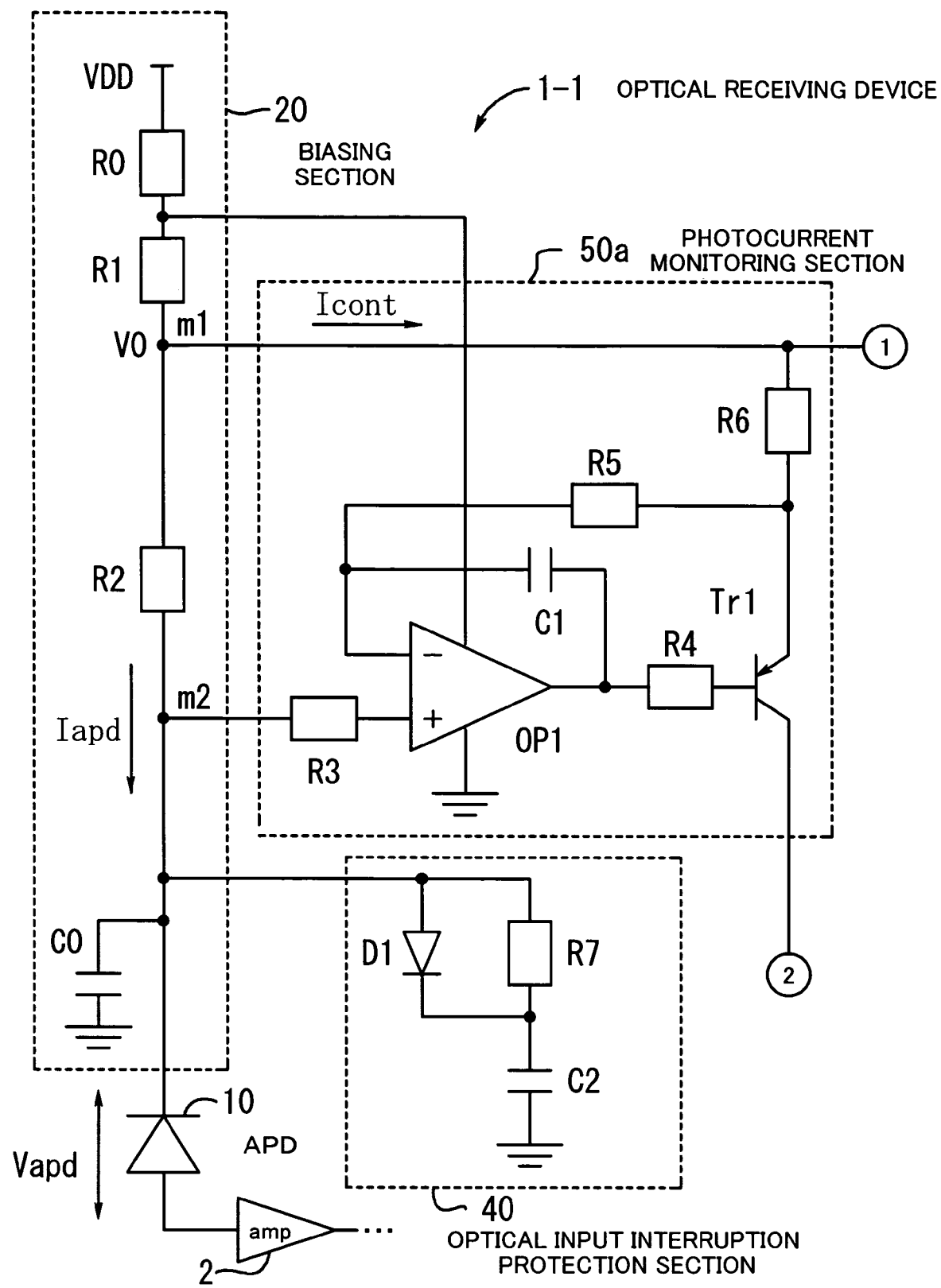
FIG. 6 is a diagram showing the circuit arrangement of the optical receiving device.
Figure 7:
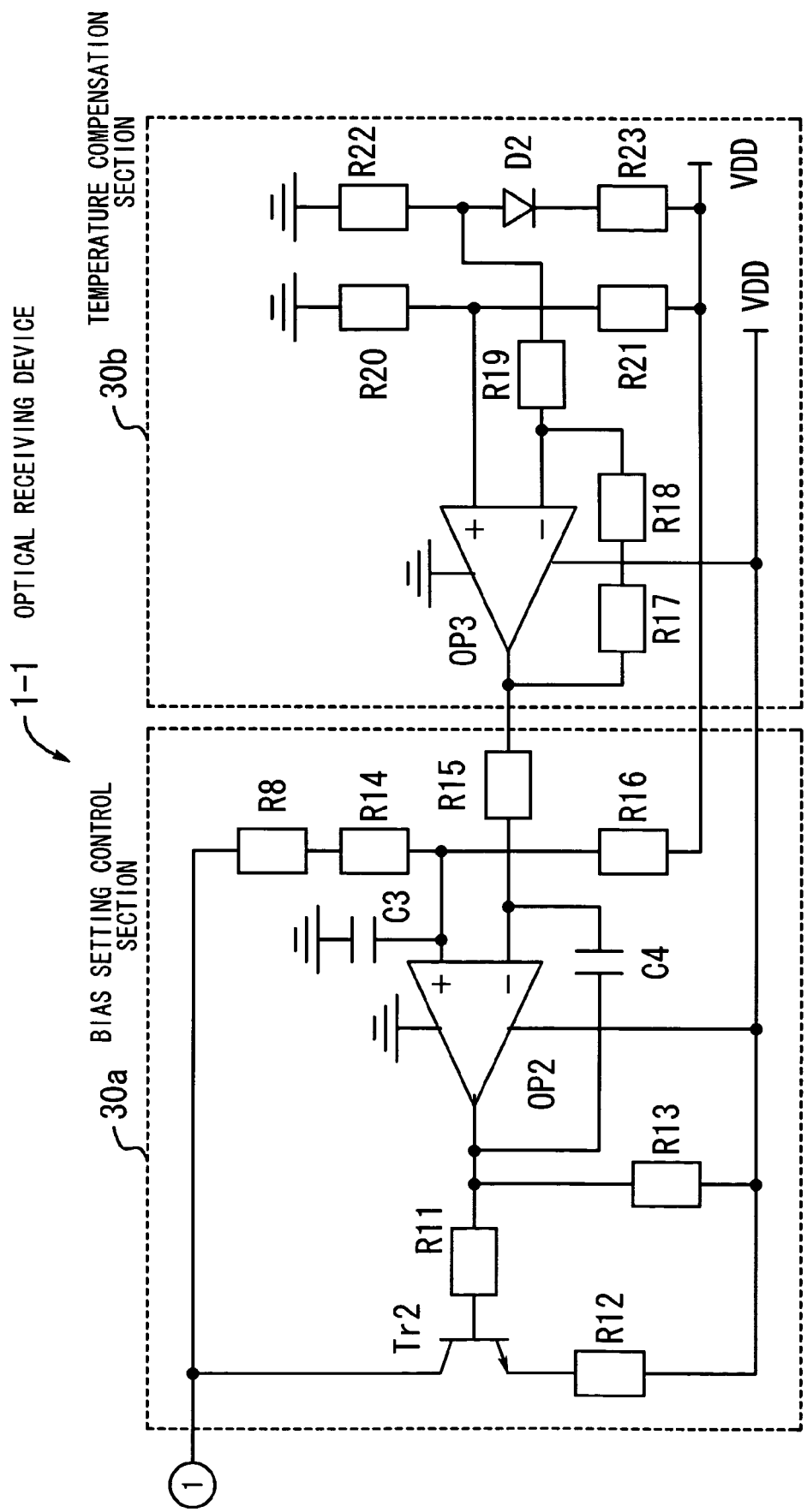
FIG. 7 is a diagram also showing the circuit arrangement of the optical receiving device.
Figure 8:
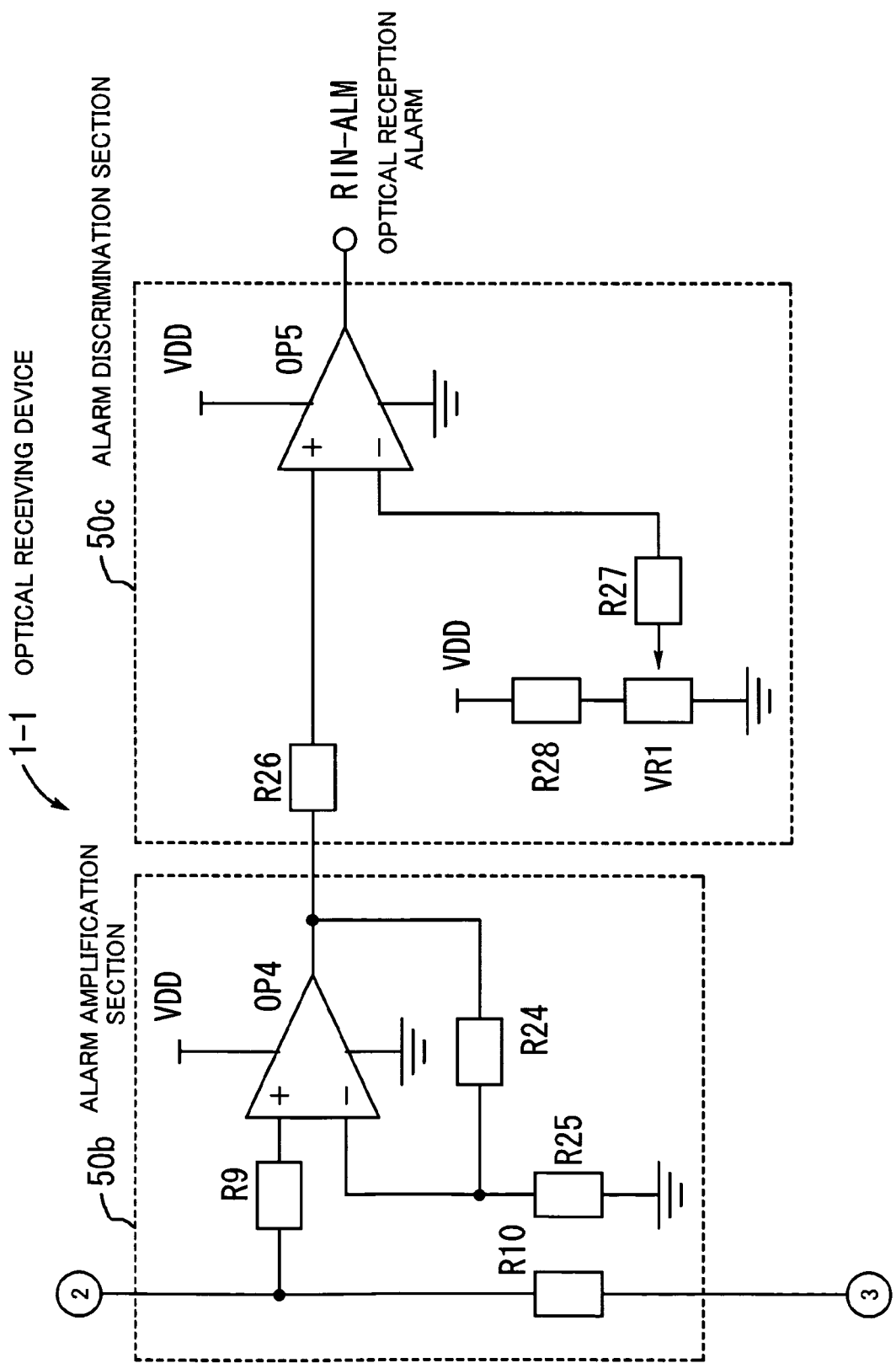
FIG. 8 is a diagram showing the circuit arrangement of the optical receiving device.
Figure 9:
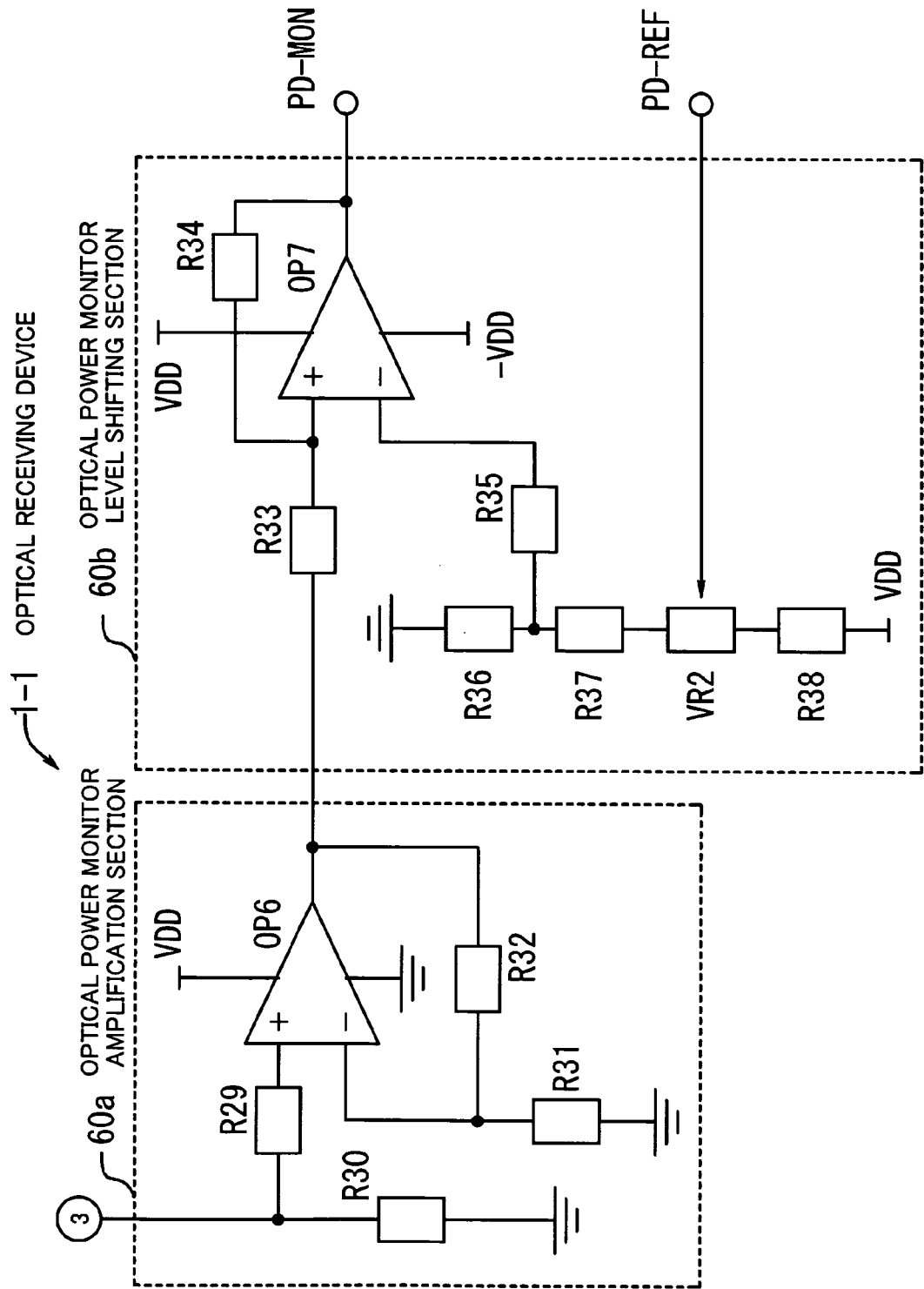
FIG. 9 is a diagram showing the circuit arrangement of the optical receiving device.
Figure 10:
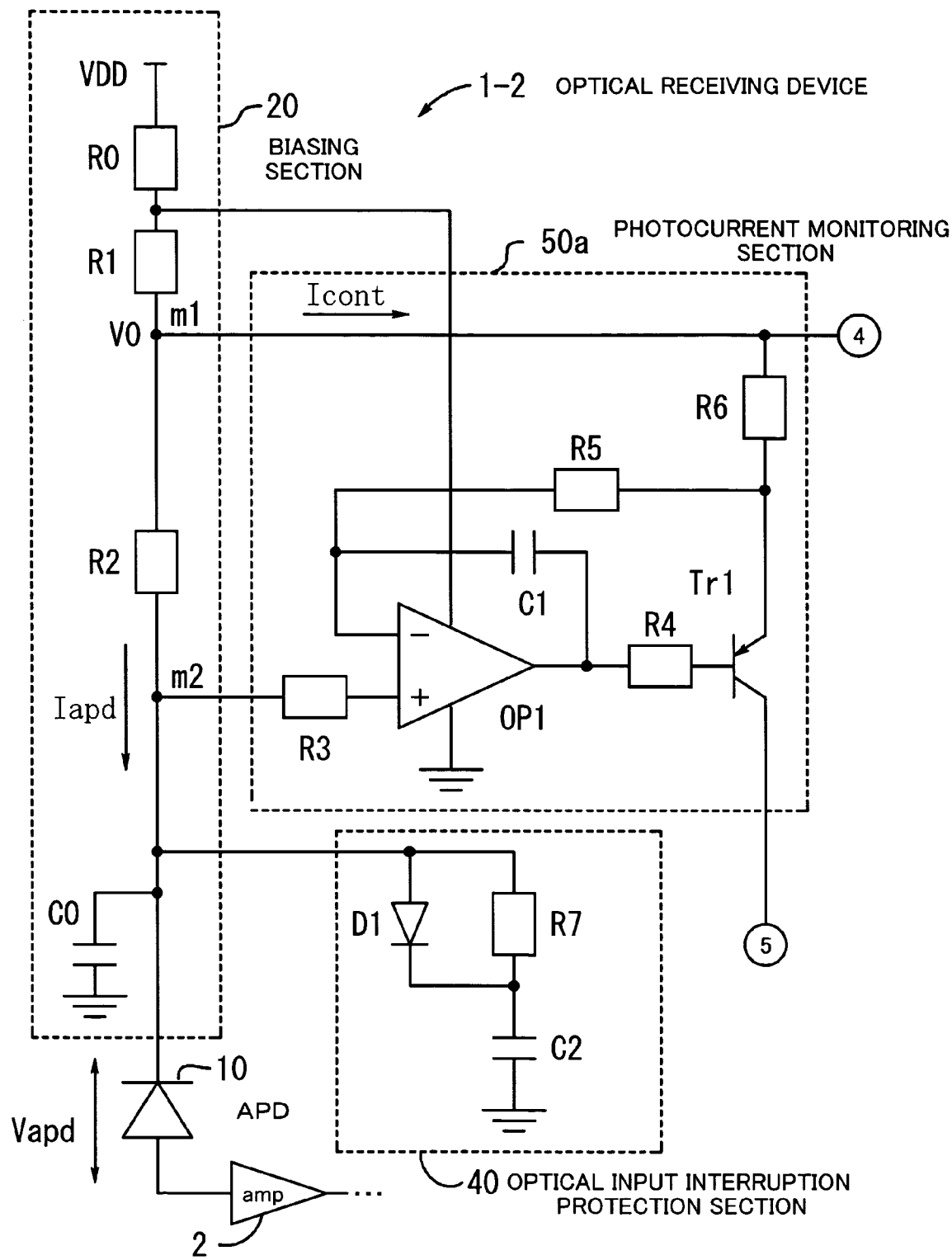
FIG. 10 is a diagram showing the circuit arrangement of another optical receiving device.
Figure 11:
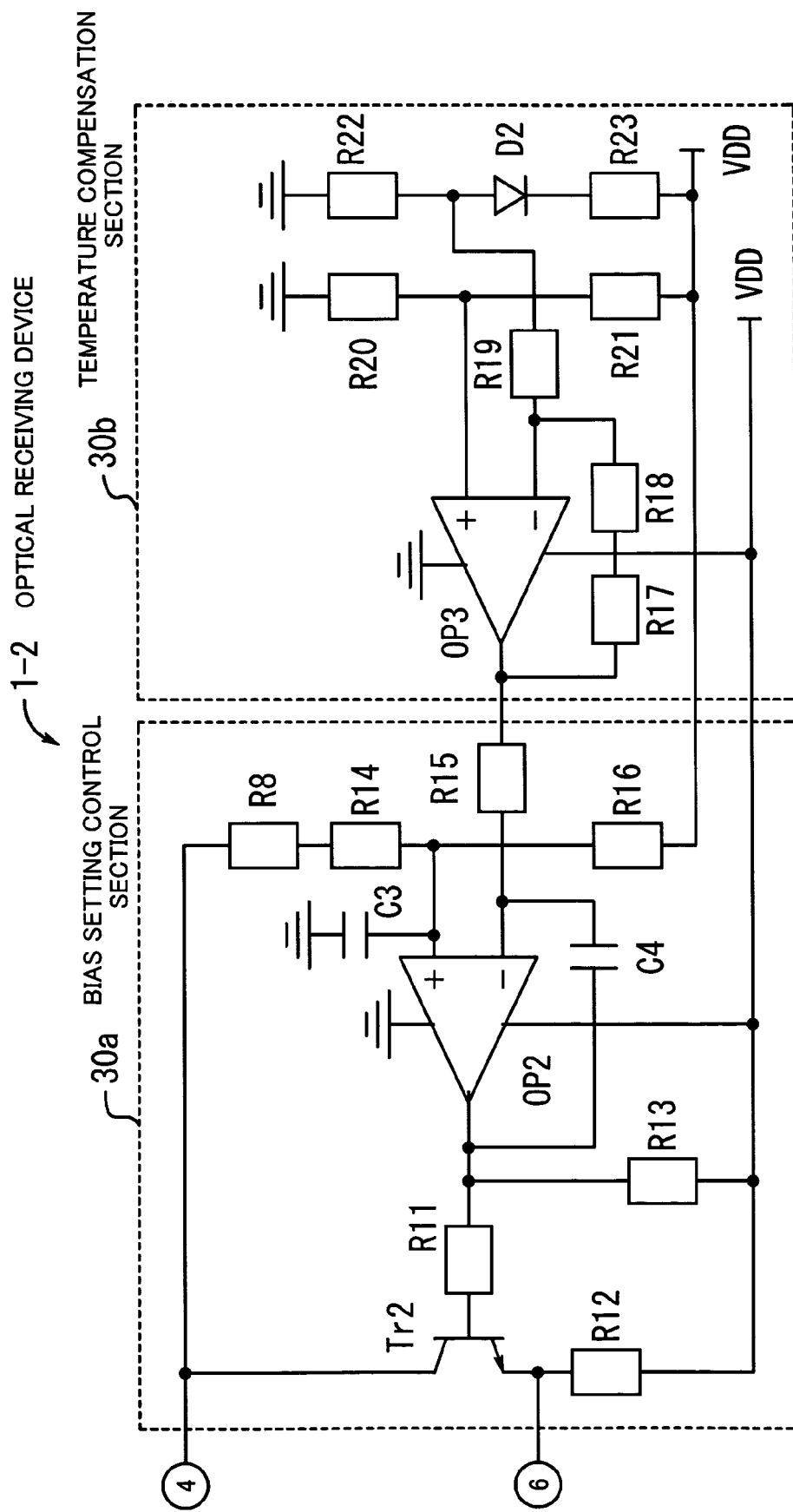
FIG. 11 is a diagram also showing the circuit arrangement of the optical receiving device.
Figure 12:
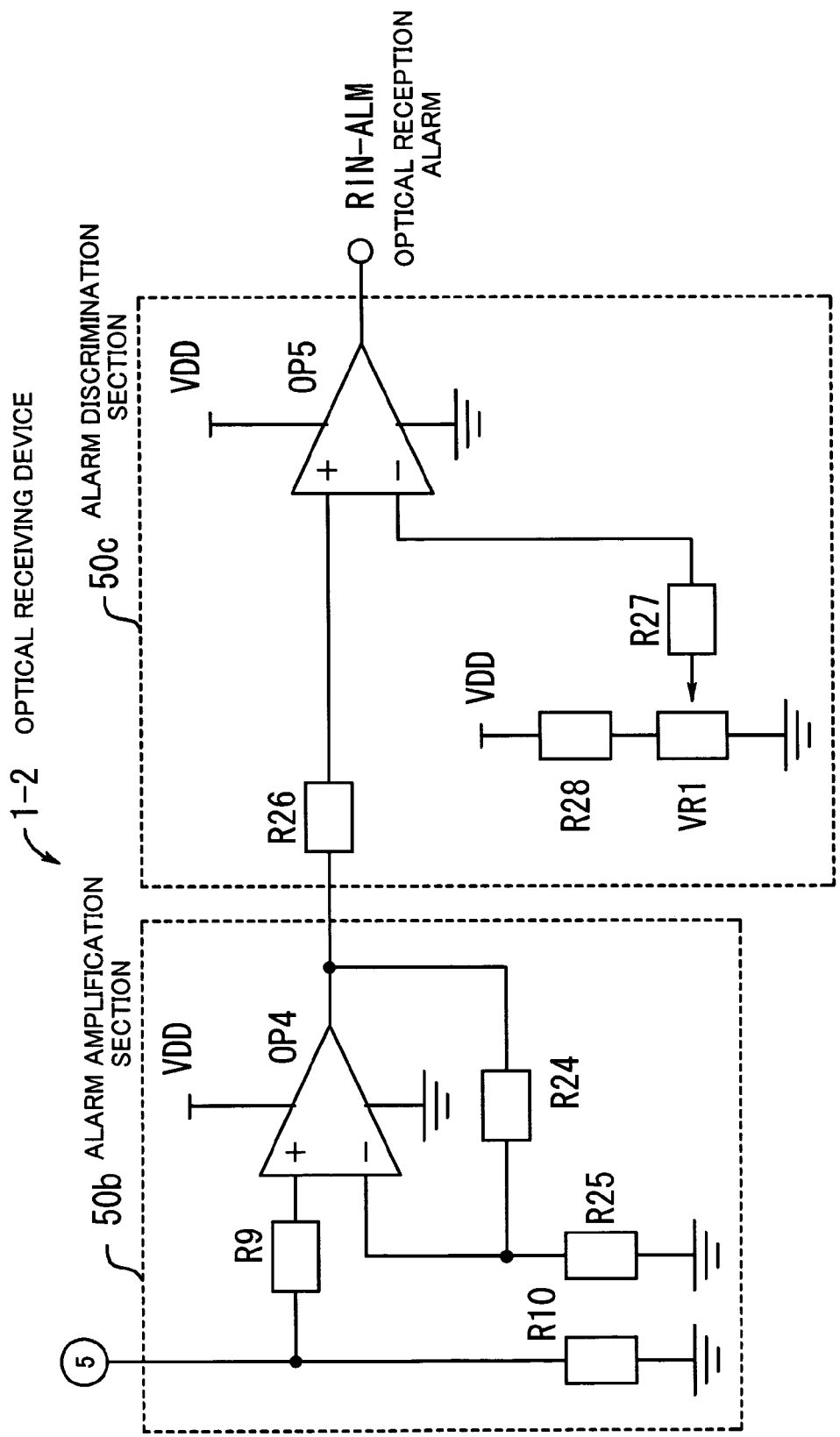
FIG. 12 is a diagram showing the circuit arrangement of the optical receiving device.

FIG. 6 shows the APD 10, the biasing section 20, the optical input interruption protection section 40 and the photocurrent monitoring section 50a, and FIG. 7 shows the bias setting control section 30a and the temperature compensation section 30b. FIG. 8 shows the alarm amplification section 50b and the alarm discrimination section 50c, and FIG. 9 shows the optical power monitor amplification section 60a and the optical power monitor level shifting section 60b.

The bias setting control section 30a and the temperature compensation section 30b correspond to the bias control section 30 of the present invention, and the photocurrent monitoring section 50a, the alarm amplification section 50b and the alarm discrimination section 50c correspond to the alarm issuing section 50 of the present invention. The optical power monitoring section of the present invention is constituted by the optical power monitor amplification section 60a and the optical power monitor level shifting section 60b.

First, the connections of individual elements will be described. A resistor R0 has one end connected to the power supply voltage VDD, and has the other end connected to one end of a resistor R1 and one power supply terminal of an operational amplifier OP1. The other end of the resistor R1 is connected to one end of a resistor R2, one end of a resistor R6, one end of a resistor R8 (FIG. 7), and the collector of an NPN transistor Tr2 (FIG. 7). The other end of the resistor R2 is connected to one end of a capacitor C0, the cathode of the APD 10, one end of a resistor R3, the anode of a diode D1, and one end of a resistor R7. The capacitor C0 has the other end connected to GND. The anode of the APD 10 is connected to the amplifier 2, of which the output stage is connected to a circuit such as CDR, not shown.

The other end of the resistor R3 is connected to one input terminal (+) of the operational amplifier OP1, of which the other input terminal (−) is connected to one end of a resistor R5 as well as to one end of a capacitor C1. The operational amplifier OP1 has an output terminal connected to the other end of the capacitor C1 and one end of a resistor R4, and has the other power supply terminal connected to GND.

A PNP transistor Tr1 has an emitter connected to the other ends of the resistors R5 and R6, has a base connected to the other end of the resistor R4, and has a collector connected to one ends of resistors R9 and R10 (FIG. 8). The cathode of the diode D1 is connected to the other end of the resistor R7 and one end of a capacitor C2. The capacitor C2 has the other end connected to GND.

The emitter of the NPN transistor Tr2 is connected to one end of a resistor R12, and the base of same is connected to one end of a resistor R11. The other end of the resistor R12, one end of a resistor R13 and one power supply terminals of operational amplifiers OP2 and OP3 are connected to the power supply VDD. The other end of the resistor R11 is connected to the other end of the resistor R13, the output terminal of the operational amplifier OP2, and one end of a capacitor C4.

The operational amplifier OP2 has one input terminal (+) connected to one end of a capacitor C3 and one ends of resistors R14 and R16, and has the other input terminal (−) connected to the other end of the capacitor C4 and one end of a resistor R15. The other power supply terminal of the operational amplifier OP2 and the other end of the capacitor C3 are connected to GND.

The other ends of the resistors R8 and R14 are connected to each other. The other end of the resistor R16 and one ends of resistors R21 and R23 are connected to the power supply VDD. The other end of the resistor R15 is connected to the output terminal of the operational amplifier OP3 as well as to one end of a resistor R17. The operational amplifier OP3 has the other power supply terminal connected to GND, and has one input terminal (+) connected to one end of a resistor R20 and the other end of the resistor R21.

The other end of the resistor R17 is connected to one end of a resistor R18, of which the other end is connected to the other input terminal (−) of the operational amplifier OP3 and one end of a resistor R19. The other end of the resistor R20 and one end of a resistor R22 are connected to GND. The resistor R19 has the other end connected to the other end of the resistor R22 and the anode of a diode temperature sensor D2, of which the cathode of the diode temperature sensor D2 is connected to the other end of the resistor R23.

The resistor R9 has the other end connected to one input terminal (+) of an operational amplifier OP4, and the resistor R10 has the other end connected to one ends of resistors R29 and R30 (FIG. 9). The other input terminal (−) of the operational amplifier OP4 is connected to one ends of resistors R24 and R25, and the resistor R25 is connected at other end to GND. The operational amplifier OP4 has one power supply terminal connected to VDD and has the other power supply terminal connected to GND.

The output terminal of the operational amplifier OP4 is connected to the other end of the resistor R24 and one end of a resistor R26, of which the other end is connected to one input terminal (+) of an operational amplifier OP5. A resistor R28 has one end connected to the power supply VDD and has the other end connected to one terminal of a volume VR1, of which the other terminal is connected to GND.

The common terminal of the volume VR1 is connected to one end of a resistor R27, of which the other end is connected to the other input terminal (−) of the operational amplifier OP5. The operational amplifier OP5 has one power supply terminal connected to VDD and has the other power supply terminal connected to GND. The output terminal of the operational amplifier OP5 outputs the optical reception alarm RIN-ALM.

The resistor R29 has the other end connected to one input terminal (+) of an operational amplifier OP6, and the resistor R30 has the other end connected to GND. The other input terminal (−) of the operational amplifier OP6 is connected to one ends of resistors R31 and R32, and the resistor R31 is connected at other end to GND. The operational amplifier OP6 has one power supply terminal connected to VDD and has the other power supply terminal connected to GND.

The output terminal of the operational amplifier OP6 is connected to the other end of the resistor R32 as well as to one end of a resistor R33. The other end of the resistor R33 is connected to one input terminal (+) of an operational amplifier OP7 and one end of a resistor R34. A resistor R36 has one end connected to GND and has the other end connected to one ends of resistors R35 and R37. The other end of the resistor R35 is connected to the other input terminal (−) of the operational amplifier OP7. The resistor R37 has the other end connected to one terminal of a volume VR2, of which the other terminal is connected to one end of a resistor R38. The other end of the resistor R38 is connected to VDD.

The common terminal of the volume VR2 provides a reference voltage PD-REF. The operational amplifier OP7 has one power supply terminal connected to VDD and has the other power supply terminal connected to −VDD. The output terminal of the operational amplifier 0P7 is connected to the resistor R34 and provides an optical power monitor voltage PD-MON.

In the following, operations of the individual blocks will be described. The biasing section 20 (FIG. 6) applies the bias voltage V0 to the APD 10, and the bias setting control section 30a (FIG. 7) stabilizes the bias voltage V0 against variations in temperature and power supply.

The resistor R7 and the capacitor C2 in the optical input interruption protection section 40 (FIG. 6) constitute the time constant circuit for determining the time constant $\tau 1$. The time constant $\tau 2$ of the bias setting control section 30a is determined by the operational amplifier OP2 (FIG. 7) and the discrete devices (capacitors C3 and C4, resistors R8, R14 and R15, etc.) around the operational amplifier OP2.

Figure 5:
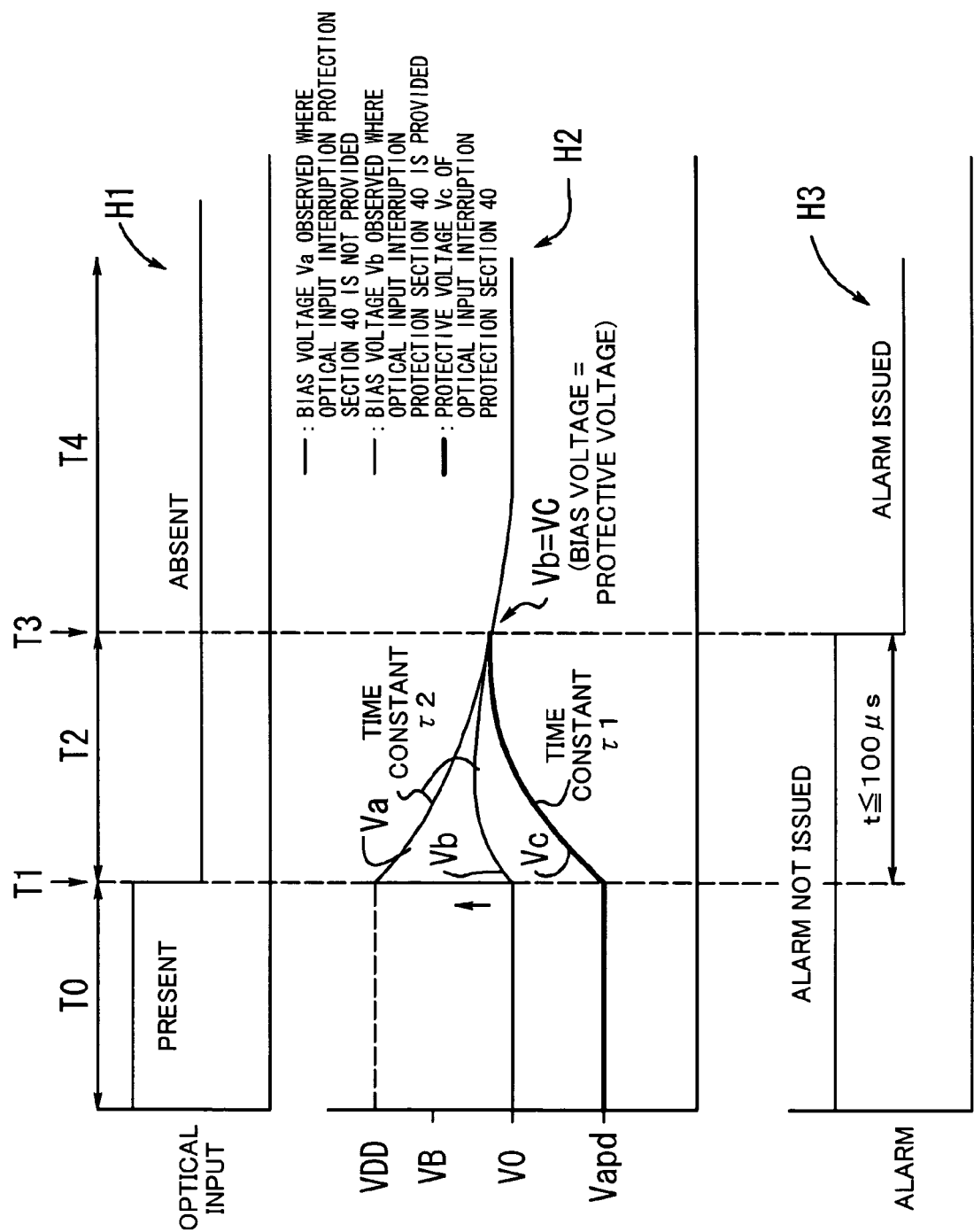
FIG. 5 is a chart showing changes of voltage waveforms due to time constants.

In order to increase the rate of the time constant $\tau 2$ (in order to quickly drop the bias voltage Vb during the interval T2 shown in FIG. 5 by increasing the rate of the time constant $\tau 2$), a high-speed operational amplifier is used for the operational amplifier OP2 and also the values of the discrete devices around the operational amplifier OP2 are determined so that the cutoff frequency may have a small value.

The bias setting control section 30a monitors the bias voltage V0 through the input terminal (+) of the operational amplifier OP2. For power supply variation, feedback control is performed (the output of the operational amplifier OP2 is applied to the base of the transistor Tr2 to control the Icont draw amount) so that the voltage monitored through the input terminal (+) of the operational amplifier OP2 may become equal to the voltage currently applied to the input terminal (−) of the same amplifier OP2, thereby controlling the bias voltage V0 to a constant value.

In connection with temperature variation, the input terminal (+) of the operational amplifier OP3 in the temperature compensation section 30b (FIG. 7) is applied with the voltage divided by the resistors R20 and R21 while the input terminal (−) of the same amplifier OP3 is applied with the voltage obtained through the diode temperature sensor D2 (FIG. 7). Thus, the operational amplifier OP3 outputs a temperature compensation voltage. Accordingly, for temperature variation, the operational amplifier OP2 (FIG. 7) in the bias setting control section 30a performs feedback control so that the voltage monitored through the input terminal (+) may become equal to the temperature compensation voltage applied to the input terminal (−), to thereby variably set the bias voltage V0 in accordance with temperature.

The photocurrent monitoring section 50a (FIG. 6) extracts information about the current Iapd flowing through the APD 10 (FIG. 6) and supplies the extracted information to the alarm amplification section 50b (FIG. 8) and the optical power monitor amplification section 60a (FIG. 9) (in practice, the photocurrent monitoring section 50a monitors the voltage across the resistor R2 (FIG. 6), converts the monitored voltage to an electric current by means of the transistor Tr1 (FIG. 6), and supplies the result to the alarm amplification section 50b and the optical power monitor amplification section 60a).

Like the bias setting control section 30a, the photocurrent monitoring section 50a has a loop for monitoring the bias voltage V0 and performing feedback control, thus constituting a double loop such that the loop of the photocurrent monitoring section 50a is within the loop of the bias setting control section 30a (both the photocurrent monitoring section 50a and the bias setting control section 30a have a feedback loop for monitoring the bias voltage V0 and converting the monitored voltage to an electric current).

In this arrangement, if the time constants of the loops are close to each other, inconveniences such as oscillation may possibly be caused. Such inconveniences are avoided by increasing the response speed of the photocurrent monitoring section 50a. Designing the circuit in this manner makes it possible to neglect the time constant of the photocurrent monitoring section 50a, and only the time constant of the bias setting control section 30a may be taken into consideration (since the time constant of the photocurrent monitoring section 50a can be neglected, it is omitted in the interval T2 of FIG. 5 and only the time constant $\tau 2$ of the bias setting control section 30a is shown as a representative time constant).

Thus, an ultrahigh-speed operational amplifier is used for the operational amplifier OP1 so that the response speed of the photocurrent monitoring section 50a may be significantly higher than that of the bias setting control section 30a. Also, the operational amplifier OP1 is operated with a high driving voltage so that the high-potential bias voltage of the APD 10 can be input. Further, to increase the response speed of the loop of the photocurrent monitoring section 50a to the highest possible level, the circuit is designed such that the time constant of the loop is determined by the devices around the operational amplifier OP1.

The reason is as follows: If the cutoff frequency of the operational amplifier OP1 itself (the cutoff frequency during open-loop operation of the operational amplifier OP1) is closely related with the time constant of the loop, variation of the operational amplifier OP1 caused due to power supply variation, for example, affects the time constant of the loop (where the time constant is determined by the resistors and capacitor around the amplifier, the time constant can be fixed and is influenced little by power supply variation etc.).

The alarm amplification section 50b (FIG. 8) amplifies the information from the photocurrent monitoring section 50a to such an extent as to secure the necessary margin for discriminating the information. To shorten the alarm issue time, however, a high-speed operational amplifier is used for the operational amplifier OP4 (FIG. 8). Also, the gain of the alarm amplification section 50b is determined so that a sufficient discrimination margin (level difference large enough to permit the determination as to interruption of the optical input to be made) can be secured for the alarm discrimination section 50c of succeeding stage.

The operational amplifier OP5 (comparator) of the alarm discrimination section 50c (FIG. 8) compares the monitored voltage amplified by the alarm amplification section 50b with a voltage set beforehand by the volume VR1. When the optical input is interrupted, the amplifier OP5 issues the optical reception alarm RIN-ALM.

The optical power monitor amplification section 60a (FIG. 9) amplifies the information from the photocurrent monitoring section 50a and converts the result to an optical power monitor voltage. Since the required amplitude of the optical power monitor voltage is already obtained by the gain of the optical power monitor amplification section 60a, the optical power monitor level shifting section 60b (FIG. 9) performs level shifting alone and outputs the result as the optical power monitor voltage PD-MON (the device of the present invention permits the monitored voltages of a plurality of other signals to be checked, and thus is capable of shifting the level so as to make the amplitude ranges of the monitored voltages uniform). Also, the section 60b divides a stabilizing voltage by means of the resistors and outputs the reference voltage PD-REF to outside.

A modification of the optical receiving device 1-1 shown in FIGS. 6 to 9 will be now described. FIGS. 10 to 13 illustrate the arrangement of an optical receiving device according to the modification, and the blocks constituting the optical receiving device 1-2 of the modification are identical with those constituting the aforementioned optical receiving device 1-1.

The optical receiving devices 1-1 and 1-2 differ from each other in that while the optical power monitor amplification section 60a of the optical receiving device 1-1 receives the electric current information from the photocurrent monitoring section 50a, the optical power monitor amplification section 60a of the optical receiving device 1-2 receives the electric current information from the bias setting control section 30a.

Figure 13:
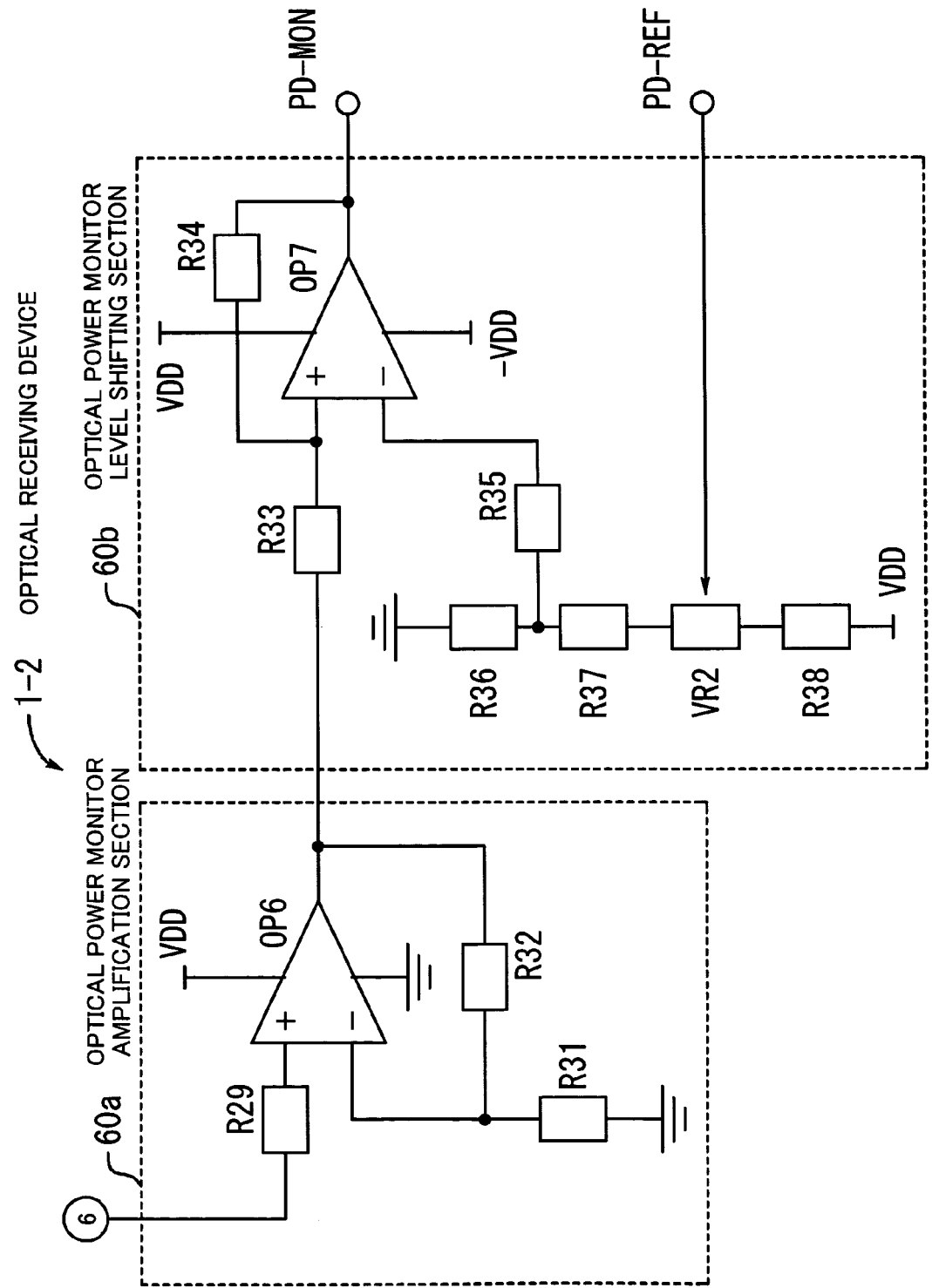
FIG. 13 is a diagram showing the circuit arrangement of the optical receiving device.

For this reason, the elements are connected differently as described below. The collector of the transistor Tr1 (FIG. 10) is connected to one ends of the resistors R9 and R10 (FIG. 12), and the resistor R10 is connected at other end to GND. The emitter of the transistor Tr2 (FIG. 11) is connected to one end of the resistor R12 (FIG. 11) as well as to one end of the resistor R29 (FIG. 13). The arrangement of the other elements and the operation are identical with those explained above, and therefore, description thereof is omitted.

Figure 14:
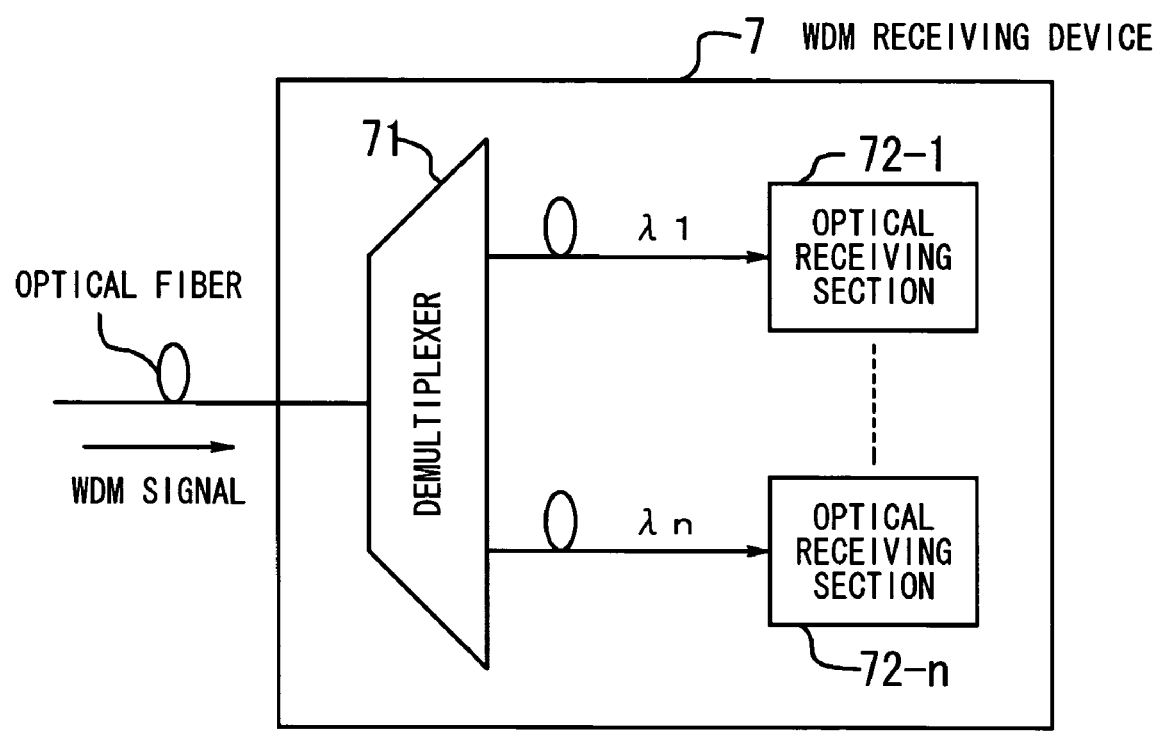
FIG. 14 is a diagram showing the arrangement of a WDM receiving device.

As an exemplary application of the optical receiving device 1 of the present invention, a WDM (Wavelength Division Multiplex) receiving device in which the present invention is applied to WDM will be now described. FIG. 14 shows the arrangement of the WDM receiving device 7 which comprises a demultiplexer 71 and optical receiving sections 72-1 to 72-n. The demultiplexer 71 receives a WDM signal through an optical fiber and demultiplexes the multiplexed signal into optical signals of respective wavelengths $\lambda 1$ to $\lambda n$. The optical receiving sections 72-1 to 72-n, each of which corresponds to the optical receiving device 1 of the present invention, receive the demultiplexed optical signals of the respective wavelengths and convert the signals to respective electrical signals. Also, when the optical input is interrupted, each optical receiving section generates an alarm signal.

Figure 15:
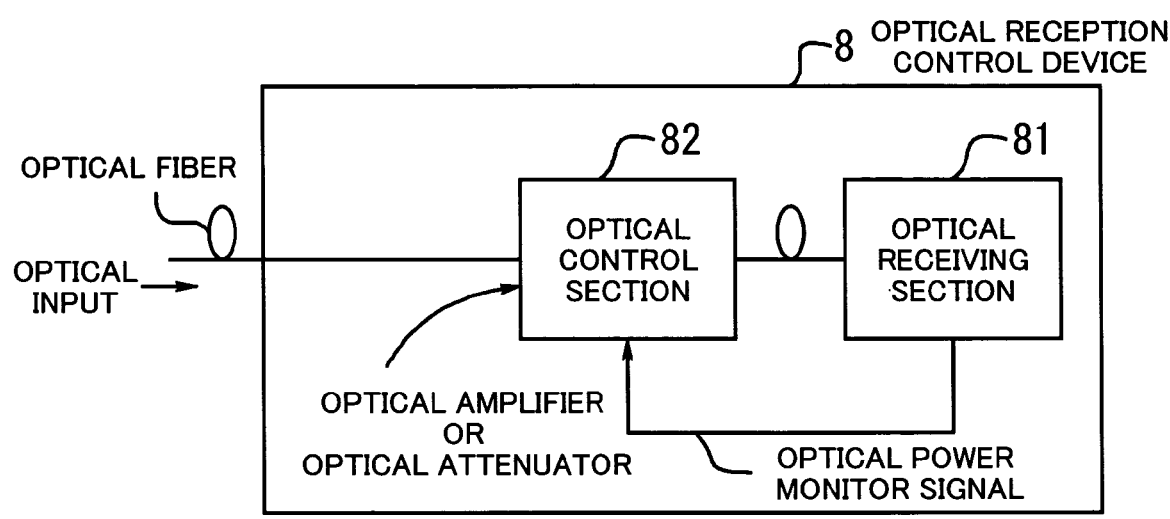
FIG. 15 is a diagram showing the arrangement of an optical reception control device.

Another exemplary application of the present invention will be now described. FIG. 15 shows the arrangement of an optical reception control device 8 which comprises an optical receiving section 81 (corresponding to the optical receiving device 1 of the present invention) and an optical control section 82 (optical amplifier or optical attenuator) arranged at the stage preceding the optical receiving section 81.

The optical receiving section 81 supplies an optical power monitor signal (corresponding to the optical power monitor voltage PD-MON) to the optical control section 82, which then controls the amount of optical amplification or optical attenuation. Thus, by performing feedback control with respect to the gain, it is possible to cope with wideband input power. Also, the optical reception control device 8 may be used in place of each of the optical receiving sections 72-1 to 72-n of the aforementioned WDM receiving device 7 shown in FIG. 14.

As described above, in the optical receiving device 1 of the present invention, the photocurrent of the light receiving element is monitored, and when the bias voltage and the protective voltage become equal to each other, the optical input interruption-indicative alarm controlled by the time constants is issued. It is therefore unnecessary to use a correction circuit for correcting the threshold, which is required in the conventional device, or to use a fast alarm derived from a clock data recovery circuit etc. for shortening the alarm issue time so as to meet the standard. Thus, according to the present invention, the accuracy of optical input interruption detection can be improved and also the alarm issue time can be made to meet the standard, making it possible to provide a high-quality optical receiving device.

In the above description, the optical receiving device 1 of the present invention is applied to a WDM receiving device, by way of example. It should be noted, however, that the application of the present invention is not limited to WDM and that the invention is applicable to diverse fields of optical communications including SONET/SDH transmission systems and optical subscriber line access systems.

As described above, the optical receiving device of the present invention includes the bias control section for stabilizing the bias voltage applied to the light receiving element against variations in temperature and power supply, and the optical input interruption protection section for protecting the light receiving element by means of the protective voltage. The photocurrent of the light receiving element is monitored, and when the bias voltage and the protective voltage become equal to each other, it is judged that the optical input has been interrupted and an alarm is issued. Thus, interruption of the optical input is detected directly based on the information about the photocurrent, making it unnecessary to use the threshold correction circuit which is required in the conventional device. Also, since the accuracy of optical input interruption detection can be enhanced, the optical receiving device can be improved in quality and reliability.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical receiving device for receiving an optical signal and detecting an interruption of the optical input, comprising:
    a light receiving element for receiving the optical signal and converting same into an electrical signal;
    a bias control section for stabilizing a bias voltage applied to said light receiving element against variations in temperature and power supply;
    an optical input interruption protection section for protecting said light receiving element by means of a protective voltage so that said light receiving element may not be broken due to an excessive rise of the bias voltage when the optical input is interrupted; and
    an alarm issuing section for monitoring a photocurrent of said light receiving element and issuing an alarm on detecting an interruption of the optical input when the bias voltage and the protective voltage become equal to each other.

2. The optical receiving device according to claim 1, wherein an alarm issue time from the interruption of the optical input to the issue of the alarm by said alarm issuing section is controlled based on a time constant of said bias control section and a time constant of said optical input interruption protection section.

3. The optical receiving device according to claim 2, wherein the time constant of said bias control section and the time constant of said optical input interruption protection section are determined such that the bias voltage and the protective voltage do not exceed a breakdown voltage of said light receiving element when the optical input is interrupted and also that a time required from the interruption of the optical input until the bias voltage and the protective voltage coincide with each other meets a standard defining the alarm issue time.

4. The optical receiving device according to claim 1, further comprising an optical power monitoring section for monitoring optical power based on electric current information from said alarm issuing section or electric current information from said bias control section.

5. The optical receiving device according to claim 4, wherein said optical power monitoring section performs level shifting to output a desired optical power monitor voltage.

6. A WDM receiving device for receiving a WDM signal, comprising:
- a demultiplexer for receiving the WDM signal through an optical fiber and demultiplexing the multiplexed signal into optical signals of respective wavelengths; and
- optical receiving sections each including a light receiving element for receiving a corresponding demultiplexed optical signal and converting same into an electrical signal, a bias control section for stabilizing a bias voltage applied to the light receiving element against variations in temperature and power supply, an optical input interruption protection section for protecting the light receiving element by means of a protective voltage so that the light receiving element may not be broken due to an excessive rise of the bias voltage when the optical input is interrupted, and an alarm issuing section for monitoring a photocurrent of the light receiving element and issuing an alarm on detecting an interruption of the optical input when the bias voltage and the protective voltage become equal to each other.

7. The WDM receiving device according to claim 6, wherein an alarm issue time from the interruption of the optical input to the issue of the alarm by the alarm issuing section is controlled based on a time constant of the bias control section and a time constant of the optical input interruption protection section.

8. The WDM receiving device according to claim 7, wherein the time constant of the bias control section and the time constant of the optical input interruption protection section are determined such that the bias voltage and the protective voltage do not exceed a breakdown voltage of the light receiving element when the optical input is interrupted and also that a time required from the interruption of the optical input until the bias voltage and the protective voltage coincide with each other meets a standard defining the alarm issue time.

9. The WDM receiving device according to claim 6, wherein each said optical receiving section further includes an optical power monitoring section for monitoring optical power based on electric current information from the alarm issuing section or electric current information from the bias control section.

10. The WDM receiving device according to claim 9, wherein the optical power monitoring section performs level shifting to output a desired optical power monitor voltage.

11. An optical reception control device for controlling reception of an optical signal, comprising:
- an optical control section for receiving the optical signal through an optical fiber and controlling amplification or attenuation of the optical signal based on an optical power monitor signal; and
- an optical receiving section including a light receiving element for receiving the optical signal from said optical control section and converting the received optical signal into an electrical signal, a bias control section for stabilizing a bias voltage applied to the light receiving element against variations in temperature and power supply, an optical input interruption protection section for protecting the light receiving element by means of a protective voltage so that the light receiving element may not be broken due to an excessive rise of the bias voltage when the optical input is interrupted, an alarm issuing section for monitoring a photocurrent of the light receiving element and issuing an alarm on detecting an interruption of the optical input when the bias voltage and the protective voltage become equal to each other, and an optical power monitoring section for generating the optical power monitor signal based on electric current information from the alarm issuing section or electric current information from the bias control section.

12. A WDM receiving device for receiving a WDM signal, comprising:
- a demultiplexer for receiving the WDM signal through an optical fiber and demultiplexing the multiplexed signal into optical signals of respective wavelengths; and
- optical reception control sections each including an optical control section for receiving a corresponding demultiplexed optical signal and controlling amplification or attenuation of the optical signal based on an optical power monitor signal, a light receiving element for receiving the optical signal from the optical control section and converting the received optical signal into an electrical signal, a bias control section for stabilizing a bias voltage applied to the light receiving element against variations in temperature and power supply, an optical input interruption protection section for protecting the light receiving element by means of a protective voltage so that the light receiving element may not be broken due to an excessive rise of the bias voltage when the optical input is interrupted, an alarm issuing section for monitoring a photocurrent of the light receiving element and issuing an alarm on detecting an interruption of the optical input when the bias voltage and the protective voltage become equal to each other, and an optical power monitoring section for generating the optical power monitor signal based on electric current information from the alarm issuing section or electric current information from the bias control section.

* * * * *